Figure 1:
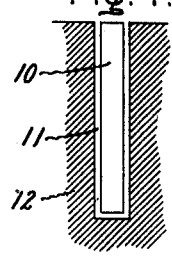

F. H. KIERSTEAD.
INDUCTION MOTOR.
APPLICATION FILED JULY 8, 1914.

1,188,182.

Patented June 20, 1916.
2 SHEETS—SHEET 1.

Witnesses:
Earl G. Klock.
J. Ellis Glenn.

Inventor:
Friend H. Kierstead,
by
His Attorney.

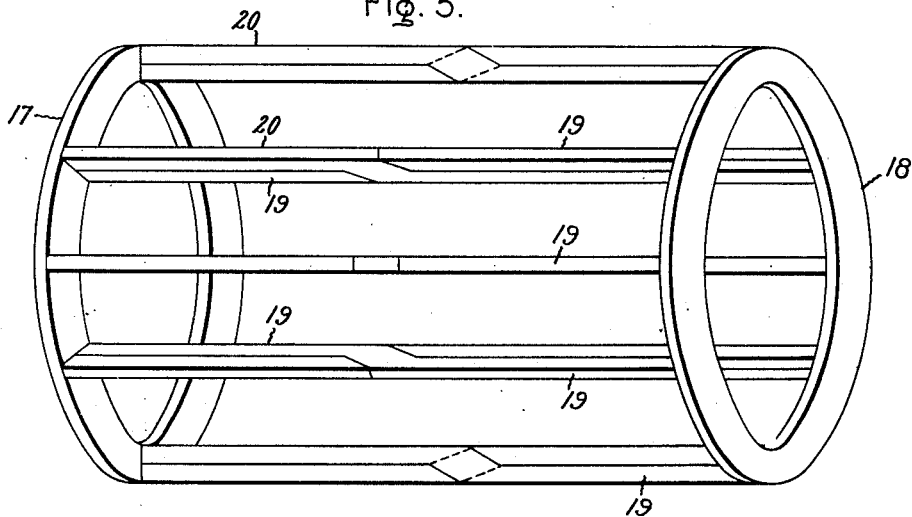
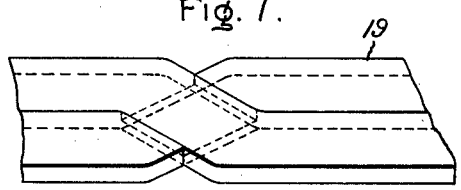
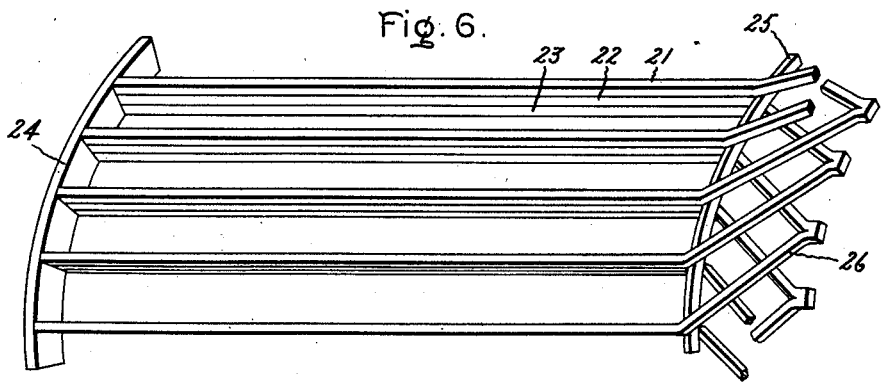
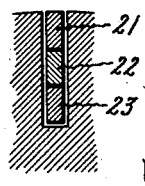

UNITED STATES PATENT OFFICE.

FRIEND H. KIERSTEAD, OF PITTSFIELD, MASSACHUSETTS, ASSIGNOR TO GENERAL ELECTRIC COMPANY, A CORPORATION OF NEW YORK.

INDUCTION-MOTOR.

1,188,182.

Specification of Letters Patent.

Patented June 20, 1916.

Application filed July 8, 1914. Serial No. 849,690.

*To all whom it may concern:*

Be it known that I, FRIEND H. KIERSTEAD, a citizen of the United States, residing at Pittsfield, county of Berkshire, State of Massachusetts, have invented certain new and useful Improvements in Induction-Motors, of which the following is a specification.

My invention relates to induction motors and more particularly to the secondary winding of an induction motor.

The object of my invention is generally to provide means for increasing the starting torque of induction motors. More particularly the object of my invention is to provide a novel construction of short-circuited secondary winding for an induction motor whereby the motor will have a relatively high starting torque.

In carrying out my invention, I provide means for increasing the eddy current loss due to the current flowing in the secondary winding of an induction motor, when the secondary current is of relatively high frequency, that is when the motor is starting or when running at high slips.

More specifically I provide a novel construction of squirrel-cage winding for an induction motor in which the eddy current loss is relatively high when the secondary currents are of relatively high frequency, thereby providing an induction motor having high starting torque.

The features of my invention which I believe to be patentably novel are definitely indicated in the claims appended hereto.

The principle of my invention, together with its application to the secondary winding of an induction motor will be understood from the following description taken in connection with the accompanying drawings, in which:

Figures 1, 2, 3 and 4 are diagrammatic views illustrating the principle of my invention; Figs. 5 and 6 are diagrammatic views in perspective of two forms of squirrel-cage windings embodying the principle of my invention, and Figs. 7 and 8 are detail views.

Eddy currents in the secondary winding of an induction motor at starting produce high losses in this winding, and thereby increase the starting torque of the motor. Since the eddy current losses are a direct function of the frequency, it will be apparent that such losses are greatest when the frequency is highest. Therefore, eddy currents produce in the secondary winding of an induction motor high losses when the secondary currents are of high frequency, as when the motor is starting or when the slip is large. When the motor is up to its full speed, however, the eddy currents are nearly zero, since the frequency of the secondary current is nearly zero and hence the eddy current losses are nearly zero.

The present invention contemplates the use of current-carrying conductors for the secondary current of an induction motor so constructed and designed that eddy currents of great magnitude are set up in the conductors when the rotor of the motor is at standstill, and further when the slip of the motor is relatively large.

More specifically the invention contemplates the use of a short-circuited secondary winding of the squirrel-cage type in which the conductors have low ohmic resistance, so that a high operating efficiency is obtained, arranged and designed in accordance with the principles herein set forth.

In carrying out the invention, I arrange two or more conductors one above another in a deep slot of a magnetic member. I have found it necessary with such an arrangement that the value of the nominal current, that is the current which flows in the conductors and produces the eddy currents, be the same in the upper conductors as in the lower conductors.

My invention, therefore, consists in providing a winding adapted to carry the secondary current of an induction motor in which a plurality of conductors are arranged one above another in a deep slot of a magnetic member and so that the current flowing in each conductor is substantially equal to the current flowing in any other conductor in the same slot.

The principle underlying my invention will be best understood by a brief consideration of the current distribution in and the flux density about current-carrying conductors located in slots in magnetic material.

Figure 2:
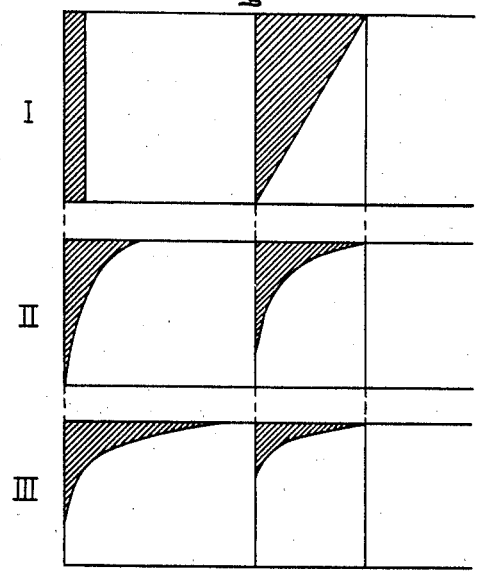

In Fig. 1 of the drawings, I have illustrated a current-carrying conductor 10 located in a deep slot 11 of a magnetic member 12. In Fig. 2, I have illustrated diagrammatically in the left column the current distribution in this conductor when the current is (I) of zero frequency, (II) of relatively low frequency, and (III) of relatively high frequency, while in the right-hand column of the figure I have diagrammatically represented the flux distribution about this conductor under the same conditions respectively.

Considering first the current density in the conductor, it will be observed that when the frequency is zero the current distribution is uniform throughout the conductor. As the frequency increases the current density at the top of the conductor increases, while the current density at the bottom of the conductor decreases, due to the fact that the reactance is higher at the bottom of the conductor than at the top. At first, with relatively low frequency the reactance is small in comparison with the ohmic resistance of the conductor, which accounts for the very gradual change in the current distribution under such conditions. As the frequency becomes higher the reactance becomes high in comparison with the ohmic resistance and the change in current distribution is then quite rapid. This is illustrated in part (III) of Fig. 2, where the frequency is relatively high and the current is forced toward the top of the conductor, making the current density in this section of the conductor very high, while the current density in the lower part of the conductor is very low, and at the bottom of the conductor is practically zero. It will be understood that the actual value of the current flowing in the conductor is the same under each condition, and hence the area of the cross-hatched portion showing the distribution of the current in the conductor is the same under each condition.

The maximum flux density about the conductor is at the top of the conductor and does not change with the frequency. This is due to the fact that the density of the flux at the top of the conductor is determined by the total current flowing in the conductor, whereas the density of the flux which cuts the conductor at any point radially beneath its top is determined by the fraction of the total current flowing in that section of the conductor located beneath the point of reference. Thus the density of the flux which cuts the conductor at any point radially beneath the top of the conductor decreases as the frequency increases, due to the crowding of the current at the top of the conductor. These conditions are clearly illustrated in the right-hand column of Fig. 2, where the top part (I) diagrammatically represents the flux density at different positions between the top and bottom of the conductor when the frequency is zero. The middle part (II) similarly represents the flux density when the frequency is relatively low, and the lower part (III) represents the flux density when the frequency is relatively high.

Figure 3:
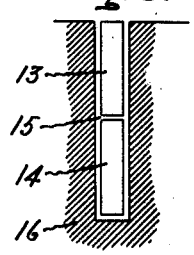
Figure 4:
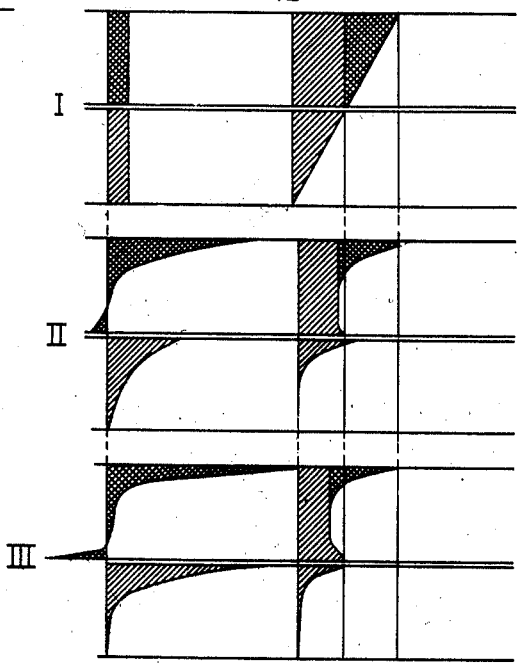

In Fig. 3 I have illustrated two conductors 13 and 14 located in a deep slot 15 of a magnetic member 16. The conductors 13 and 14 are assumed to be carrying currents of equal magnitude. In Fig. 4 I have diagrammatically illustrated in the left-hand column the current distribution in these conductors when the current is (I) of zero frequency, (II) of relatively low frequency, and (III) of relatively high frequency. In the right-hand column of Fig. 4 I have represented the flux density about these conductors under the same conditions. The double cross-hatched portions of the right-hand column of Fig. 4 indicate that part of the total flux which is due to the current flowing in the top conductor 13, while the single cross-hatched portion indicates that part of the total flux due to the current flowing in the bottom conductor 14. For the sake of simplicity, I have represented only two conductors, but it will be understood that the same principles apply to any number of conductors located one above another in a relatively deep slot of a magnetic member. I have hereinafter referred to the one conductor per slot as the "one deep-bar conductor" and to the plurality of conductors per slot as the "subdivided conductor," and it will be understood that I assume the current flowing in the "one deep-bar conductor" to be equal to the sum of the currents flowing in the "subdivided conductor."

In the case of the "subdivided conductor," inasmuch as the depth per bar is small, the difference between the flux which cuts the bottom of the bar and that which cuts the top in both the bottom and top bars is smaller at the lower frequencies than in the case of the "one deep-bar conductor." Therefore, the difference in the reactance at the bottom and at the top of each bar is smaller, and consequently there is a more uniform distribution of current in the "subdivided conductor" at low frequencies than in the "one deep-bar conductor," and as a result there is a greater loss in the "one deep-bar conductor" at low frequencies. However, since the bars of the "subdivided conductor" carry equal currents the density of the flux set up by the bottom bar which cuts the top bar does not depend upon the distribution of the current in the bottom bar, and would remain constant for all frequencies if it were not for the fact that this flux sets up eddy currents in the top bar which change the flux density about the top bar. The top bar is thus not only subjected to flux set up by the current flowing in itself but also to flux of high density which is set up by the current flowing in the lower bar or bars. In other words, a flux of much higher average density cuts the "subdivided conductor" than the "one deep-bar conductor," and this difference increases with the frequency. Therefore, it is plain that as the frequency increases a frequency will be reached where the difference between the average flux density of the "subdivided conductor" and of the "one deep-bar conductor" is sufficient to make the loss in the two cases equal, and if the frequency is increased beyond this point the loss will be greater in the "subdivided conductor." This fact is clearly illustrated in the diagrams of Fig. 4. The flux due to the bottom bar sets up eddy currents in the top bar which are opposite in direction to the main current flowing in the top bar. The magnitude of these eddy currents is represented in the left-hand column of Fig. 4 by the double cross-hatched portion to the left of the vertical reference line.

From the foregoing discussion, it will be apparent that in both the case of the "subdivided conductor" and of the "one deep-bar conductor" the loss due to eddy currents is much higher when the main or nominal current is of high frequency than when the main or nominal current is of low frequency due to the unequal distribution of the current at high frequency, and to the more equal distribution of the current as the frequency becomes smaller. In the case of an induction motor this is decidedly advantageous, since it means an increased loss at starting and at high slips when the secondary current is of relatively high frequency and a consequent high starting torque of the motor. Further, at low frequency or for conductors which are not too deep the subdivision of the conductor decreases the loss, but for higher frequencies or deeper conductors subdivision of the conductor increases the loss. That is, with a given deep conductor whether or not subdivision increases or decreases the loss depends on the frequency, and for a given frequency whether the loss is increased or decreased depends on the depth of the conductor. It will, therefore, be evident that if the frequency is maintained constant and the depth of the conductors varied, the loss in the "one deep-bar conductor" is the greater for shallow conductors, but as the conductors are made deeper and deeper the difference in losses between the "one deep-bar conductor" and the "subdivided conductor" becomes less and less until a depth is reached where the losses are equal, and beyond that depth the losses are greater in the "subdivided conductor." It will also be evident that for a conductor of given depth the loss in the "one deep-bar conductor" is greater at relatively low frequencies, and if the frequency increases a frequency will be reached where the loss in the "one deep-bar conductor" is the same as in the "subdivided conductor," and for higher frequencies the loss will be greater in the "subdivided conductor." It will thus be seen that in order to take advantage of the foregoing principles for increasing the starting torque of an induction motor a winding should be used in which either the slot depth may be made deep enough or the frequency high enough to give greater loss than in a "one deep-bar conductor."

In accordance with the foregoing principles I have devised a novel form of squirrel-cage winding for an induction motor which has small losses under running conditions when the secondary current is of low frequency but high losses at starting and high slips when the secondary current is of high frequency. In my novel winding each conductor of the ordinary squirrel-cage winding is subdivided into two or more bars placed one above another in a deep slot of the secondary magnetic member, and furthermore these several bars per slot are so arranged that equal currents flow in each bar and the total current flowing in all of the bars per slot is substantially equal to the current which would flow in the single current conductor of the ordinary winding. The embodiment of my invention in two practical forms of winding will be understood by reference to Figs. 5, 6, 7 and 8 of the drawings.

In Figs. 5 and 6 of the drawings I have, for the sake of simplicity, merely illustrated the short-circuited winding. It will of course be understood that this winding is carried by the secondary magnetic member of the motor in the usual manner. Referring first to Fig. 5 I have illustrated a winding having two short-circuiting end rings 17 and 18. Current-carrying conductors are secured between the end rings. The conductors are subdivided in accordance with the foregoing principles, and I have shown in Fig. 5, two bars per slot, one on top of the other. At the middle the construction of the bars is such that the top bar is bent down and becomes the bottom bar and the bottom bar is bent up and becomes the top bar. Thus the bars 19 are the top bars at the right-hand end of the winding and at the center are bent down so that they become the bottom bars. On the other hand the bars 20 are the top bars at the left-hand end of the winding and are bent down to become the bottom bars at the right-hand end of the winding.

Fig. 7 illustrates the construction at the center of the bars whereby the top bar becomes the bottom bar and vice versa. It will be observed that each bar is slightly offset and that the offset portion is recessed or decreased in thickness so that the two bars will neatly fit together forming substantially a single conductor. The bars are insulated from each other by any suitable insulating material, such as enamel or shellac. It will be obvious that the construction is such that the current flowing in the bar 20 is equal to the current flowing in the bar 19 of the same slot.

In Fig. 6 I have illustrated a modified construction of squirrel-cage winding embodying the principle of my invention. I have represented conductors comprising three bars 21, 22 and 23 per slot. The cross section of these bars is illustrated in Fig. 8. As will be observed in Fig. 8, the bars are placed one above another and are separated from each other by a thin film of insulating material such as enamel or shellac. Each of the bars is connected at one end to a common end ring 24. The middle conductors 22 are connected at the other end to a common end ring 25. Each top conductor 21 is connected by a V-shaped end connection 26 to a bottom conductor 23 a pole pitch away. Under these conditions the top conductors 21 and the coöperating bottom conductors 23 will be carrying currents of substantially the same magnitude. It will of course be understood that two bars per slot may be employed in which case the end ring 25 is dispensed with. Where an odd number of bars per slot, as 3 or 5, is employed, I have found it sufficient to connect the middle bar to the separate end ring 25.

It will be evident from the foregoing explanation and description that I have provided a novel construction of secondary winding for an induction motor in which the losses are smaller at relatively low frequencies and higher at relatively high frequencies than in the secondary winding constructions heretofore used. An induction motor provided with a secondary winding embodying the features of my invention will, accordingly, have high efficiency at normal running speeds and a high starting torque. Such a winding can be very advantageously used on induction motors of fifty horsepower or over operating on sixty cycle circuits. The use of a secondary winding of this character is generally applicable wherever a high starting torque and high efficiency is required, as for example in induction motors for steel rolling mills and for electric ship propulsion systems. Various other application for motors of this character will be evident to those skilled in the art.

I have explained my invention by illustrating and describing certain specific embodiments thereof, but it will be understood that the invention may be embodied in many other forms than that shown and described. I, accordingly, do not wish to be restricted to the particular forms and constructions disclosed herein by way of example for the purpose of setting forth my invention in accordance with the patent statutes. The terms of the appended claims are, therefore, not restricted to the precise structures disclosed but are intended to cover all changes and modifications within the spirit and scope of my invention.

What I claim as new and desire to secure by Letters Patent of the United States, is,—

1. In an induction motor a magnetic member having a plurality of relatively deep slots, a squirrel-cage winding comprising a pair of relatively deep conductor bars per slot, whereby said winding has relatively high reactance and relatively large eddy current losses when the secondary current is of relatively high frequency, said conductor bars being offset at their center and arranged so that the top bar becomes the bottom bar and the bottom bar becomes the top bar, the conductor bars in the same slot being insulated from each other and connected at their ends to common end rings.

2. In an induction motor a secondary member comprising a magnetic member having a plurality of relatively deep slots, two vertically arranged conductor bars in each slot, each conductor bar being so constructed that through half its length it is the bottom bar and through the remainder of its length it is the top bar, the conductor bars in the same slot being insulated from each other and connected at their ends to common end rings.

3. In an induction motor a magnetic member having a plurality of relatively deep slots, a squirrel-cage winding having deep conductors positioned in said slots whereby said conductors have a high reactance and a large eddy current loss when the secondary current is of relatively high frequency, each conductor of said squirrel-cage winding being subdivided into a plurality of bars vertically arranged and insulated from each other, and means whereby the bars of the same conductor carry substantially the same current.

4. In an induction motor a magnetic member having a plurality of relatively deep slots, a squirrel-cage winding having deep conductors positioned in said slots whereby said conductors have a high reactance and a large eddy current loss when the secondary current is of relatively high frequency, each conductor of said squirrel-cage winding being subdivided into a plurality of bars vertically arranged and insulated from each other, each bar being so constructed that through half its length it is the bottom bar and through the remainder of its length it is the top bar whereby the bars of the same conductor carry substantially the same current.

In witness whereof, I have hereunto set my hand this third day of July, 1914.

FRIEND H. KIERSTEAD.

Witnesses:
PETER SMITH,
W. W. LEWIS.